(12) United States Patent
Chai et al.

(10) Patent No.: US 12,240,999 B2
(45) Date of Patent: Mar. 4, 2025

(54) BHM IN ADHESIVE COMPOSITIONS

(71) Applicant: Ascend Performance Materials Operations LLC, Houston, TX (US)

(72) Inventors: Zheng Chai, Houston, TX (US); Jefferson Thomas Ebert, Houston, TX (US)

(73) Assignee: Ascend Performance Materials Operations LLC, Houston, TX (US)

( * ) Notice: Subject to any disclaimer, the term of this patent is extended or adjusted under 35 U.S.C. 154(b) by 239 days.

(21) Appl. No.: 17/985,445

(22) Filed: Nov. 11, 2022

(65) Prior Publication Data

US 2023/0151253 A1 May 18, 2023

Related U.S. Application Data

(60) Provisional application No. 63/278,668, filed on Nov. 12, 2021.

(51) Int. Cl.
| | | |
|---|---|---|
| *C08G 59/50* | (2006.01) | |
| *C09J 11/04* | (2006.01) | |
| *C09J 11/06* | (2006.01) | |
| *C09J 163/00* | (2006.01) | |

(52) U.S. Cl.
CPC ........ *C09J 163/00* (2013.01); *C08G 59/5013* (2013.01); *C09J 11/04* (2013.01); *C09J 11/06* (2013.01); *C09J 2301/312* (2020.08); *C09J 2301/408* (2020.08); *C09J 2301/50* (2020.08)

(58) Field of Classification Search
CPC ................ C08G 59/50; C08G 59/5006; C08G 59/5013; C08G 59/56; C09J 11/04; C09J 11/06; C09J 163/00
See application file for complete search history.

(56) References Cited

U.S. PATENT DOCUMENTS

| | | | |
|---|---|---|---|
| 5,385,990 A | 1/1995 | Abbey et al. | |
| 5,629,380 A | 5/1997 | Baldwin et al. | |
| 6,562,934 B2 | 5/2003 | Yonehama et al. | |
| 9,212,287 B2 | 12/2015 | Burckhardt et al. | |
| 2009/0163676 A1 | 6/2009 | Vedage et al. | |
| 2019/0382524 A1 | 12/2019 | Gerber | |
| 2021/0198537 A1 | 7/2021 | Mayer et al. | |
| 2024/0262956 A1 * | 8/2024 | Kasemi | C07C 209/26 |

FOREIGN PATENT DOCUMENTS

| | | | | |
|---|---|---|---|---|
| CN | 112272693 A | 1/2021 | | |
| EP | 0 508 203 A1 | 10/1992 | | |
| JP | S49 93496 A | 9/1974 | | |
| WO | WO-2021220090 A1 * | 11/2021 | ........... | C08G 59/184 |

* cited by examiner

*Primary Examiner* — Michael A Tolin
(74) *Attorney, Agent, or Firm* — COZEN O'CONNOR

(57) ABSTRACT

An adhesive composition comprising a first part comprising an epoxy resin and a second part comprising a multifunctional amine package. The multifunctional amine package comprises bis(hexamethylene)triamine and a synergist. The amine concentration is at least 10% less than the epoxy resin concentration and the adhesive composition demonstrates a sag resistance of greater than 40 mm.

21 Claims, No Drawings

BHM IN ADHESIVE COMPOSITIONS

CROSS-REFERENCE

This application is related to and claims priority to U.S. Provisional Patent Application No. 63/278,668 filed Nov. 12, 2021, which is incorporated herein by reference.

FIELD

The present disclosure relates to epoxy adhesive compositions, particularly epoxy adhesive compositions that comprise an epoxy resin and an amine package that have improved sag resistance performance.

BACKGROUND

Many epoxy resin compositions are known. These compositions are useful for many applications including adhesives and coatings.

Typically, epoxy resin compositions should have a number of properties in order to be useful as a high-quality coating, e.g., a low viscosity (so that they are readily workable and self-running at ambient temperature) and quick hardenability (without any blushing effects (turbidity or spots), even under damp cold conditions). In the hardened state, the epoxy resin coating should have an even surface with no turbidity, spots or craters, and it should possess a good hardness with the least possible brittleness, in order to withstand mechanical stress, which is especially important when used as a protective coating or a floor covering.

To improve performance and processability, thinners and hardeners are often added to the epoxy resin. When added in conventional systems, thinners, e.g., benzyl alcohol or phenols, greatly improve the workability and reduce the brittleness, but they are not incorporated into the resin matrix upon hardening. Detrimentally, thinners have a tendency to be released by evaporation or diffusion processes after hardening. Therefore, thinners which cannot be incorporated can only be used in very slight amount or not at all in low-emission systems. Another possibility of thinning epoxy resin compositions is the adding of low-molecular amines, such as isophorone diamine, xylylene diamine or dimethylaminopropylamine. But such low-molecular amines usually have a strong odor and are very irritating to the skin, and they lead to blushing effects under damp, cold conditions. Likewise, some epoxy hardeners are known.

As one example of an epoxy/hardener system, U.S. Pat. No. 5,629,380 to John M. Baldwin discloses A curable, structural epoxy adhesive composition comprising two parts. The first part comprises an amine curing agent and a catalyst, and the second part comprises an epoxy resin having an average epoxide functionality of greater than one.

U.S. Pat. No. 9,212,287 to Urs Burckhardt discloses a low-odor, low-viscosity hardener for epoxy resins comprising the (aromatic) amine of a specific formula (I), as well as a method for thinning of hardeners for epoxy resins by adding the amine of formula (I). These hardeners harden with epoxy resins quickly and without blushing to form films of high hardness and little brittleness, even without non-incorporable thinners such as benzyl alcohol. They are especially suitable for low-emission coatings.

US 2009/0163676 to Gamini Vedage discloses hardeners for epoxy resins containing at least one benzylated polyalkylene polyamine and at least one additional amine.

U.S. Pat. No. 6,562,934 to Shiniichi Yonehama specifies hardeners for epoxy resins containing an amino compound obtained by addition reaction of diamine represented by a specific formula (1) and an alkenyl compound. Conventional hardeners such as these have the drawback that they harden slowly with epoxy resins, especially at low temperatures, and without the use of non-incorporable thinners they result in rather brittle coatings.

Thus, even in view of the references, the need exists for adhesive compositions that provide performance advantages over conventional epoxy/amine systems, e.g., improvements in sag resistance, while preferably maintaining adhesive performance and processability.

SUMMARY

In one embodiment the disclosure relates to an adhesive composition comprising a first part comprising (from 40 wt % to 90 wt % of) an epoxy resin; and a second part comprising a multifunctional amine package and optionally comprising less than 75% cyclic amines and/or (from 1 wt % to 50 wt % of) solvent, e.g., a phenol, such as nonyl phenol, and/or (from 0.1 wt % to 20 wt % of) rheology modifier, preferably silica. The first part or the second part, in some cases, are not solids. The multifunctional amine package comprises bis(hexamethylene)triamine (optionally present in an amount from 1 wt % to 35 wt %, based on the adhesive composition) and a synergist (optionally comprising acetonitrile, caprolactam, aminohexanol, or aminocephalosporanic acid, or combinations thereof). The amine concentration is at least 10% less than the epoxy resin concentration and/or the solvent to bis(hexamethylene)triamine weight ratio may range from 0.1 to 4.0 and/or the volume ratio of the first part to the second part may range from 0.2 to 5. The adhesive composition may demonstrate a sag resistance ranging from 10 mm to 300 mm or of greater than 40 mm and/or the adhesive composition, when mixed, may have a viscosity less than 1500 cps and/or may have a hydrogen active equivalent weight less than 65 and/or may demonstrate a cross hatch adhesion score of at least 2B, as measured via ASTM D3359 method B and/or may demonstrate a gel time greater than 10 minutes and/or may demonstrate a yellowing index greater than 1.

The disclosure also relates to a process for making an adhesive composition, comprising dissolving in a solvent a multifunctional amine package comprising bis(hexamethylene)triamine and a synergist to form a second part; contacting the second part with a first part comprising an epoxy resin to form the adhesive composition and optionally comprising adding a rheology modifier to the second part, such that the second part has a viscosity less than 1500 cps. The adhesive composition may have a viscosity less than 1500 cps.

DETAILED DESCRIPTION

Conventional epoxy resin compositions that comprise an epoxy resin, hardeners, and thinners are known to be useful for films and coatings. These compositions often employ relatively high amounts, e.g., well over 35 wt %, of conventional aromatic or cycloaliphatic (ring-containing) amines (collectively "cyclic amines") as hardeners. These epoxy/amine systems, have not been found to provide sag resistance performance necessary for many applications, e.g., adhesion on vertical surfaces, such as vertically-hung ceramic tile. And they suffer from other performance problems such as mechanical reinforcement and flow leveling. Other drawbacks include poor performance with respect to: rheology control, anti-settling, anti-sag, mechanical reinforcement, corrosion resistance, chemical resistance, flow and leveling, fluidization and free-flow properties.

The inventors have surprisingly discovered that certain multifunctional amines, e.g., bis(hexamethylene)triamine (BHMT), when employed with an epoxy resin (and optionally with the disclosed rheology modifiers), result in adhesive compositions that demonstrate a synergistic combination of improved sag resistance performance along with similar improvements in adhesion. In some cases, the epoxy composition is a two-part system (epoxy part and amine part) that employs the aforementioned amines in the amine part. And the components (optionally in specific proportions discussed herein), allow for a 1:1 volume mix ratio, which is convenient for deploying/applying the combined adhesive.

In addition, it has been found that the use of low amounts of aromatic and/or cyclic amines (or no aromatic and/or cyclic amines), e.g., less than 35 wt %, unexpectedly keeps the multifunctional amine(s) in the liquid state, which provides for significant processability improvements. In some cases, the processability and/or sag resistance is significantly and unexpectedly improved with the addition of (even small amounts of) rheology modifier that is not nearly as reactive as the aromatic and/or cyclic amines. Stated another way, the disclosed approach is able to effectively control sagging performance with limited (or no) chemical modification of either the epoxy or the amines.

The disclosed adhesive compositions, which include a particular multifunctional amine package, advantageously maintain performance features, e.g., sag resistance, while also providing for the aforementioned adhesion improvements. Stated another way, the adhesive compositions disclosed herein beneficially demonstrate an unexpected balance of performance factors previously not achieved.

Without being bound by theory, it is postulated that the bis(hexamethylene)triamine reacts particularly well with the epoxy functionality of the epoxy resin. Specifically, the longer aliphatic linkages that separate the nitrogen atoms give the amino groups more space to react with the epoxy groups, while still remaining linked in one long chain after reaction.

In some embodiments, the adhesive composition comprises an epoxy resin and a multifunctional amine package. In some cases, the adhesive composition is a two-part adhesive system that comprises an epoxy part (the epoxy resin is a component thereof) and an amine part (the multifunctional amine package is a component thereof). The adhesive composition demonstrates synergistic combination of sag resistance performance, e.g., greater than 40 mm, and adhesive performance, e.g., a cross hatch score greater than 1

The adhesive, in some cases, may be a gel adhesive. In some embodiments, the composition may have a particular viscosity, e.g., a viscosity that balances ease-of-handling and sag resistance. For example, the composition may have a Brookfield viscosity less than 1500 cps, e.g., less than 1300 cps, less than 1100 cps, less than 1000 cps, less than 950 cps, or less than 900 cps. In terms of lower limits, the composition may have a viscosity greater than 500 cps, e.g., greater than 600 cps, greater than 700 cps, greater than 800 cps, greater than 850 cps, greater than 900 cps, or greater than 940 cps. In some embodiments, the first part and/or the second part have viscosities as noted above for the mixed composition. In some cases, the first part and/or the second part is not a solid.

In some embodiments, the second part and/or the components thereof, e.g., the BHMT and the synergist, are in liquid form. The inventors have discovered that by keeping the second part in a non-solid form, the activity with the epoxy groups of the first part is significantly and surprisingly improved. This must be balanced by the second part being too dilute, such that it becomes ineffective. In some cases, this may be achieved my maintaining an appropriate solvent to BHMT ratio. For example, the phenol to amine weight ratio may range from 0.1 to 4.0, e.g., from 0.2 to 3.5, from 0.3 to 3.0, from 0.5 to 3.0, or from 0.5 to 2.5. In terms of lower limits, the phenol to amine weight ratio may be greater than 0.1, e.g., greater than 0.2, greater than 0.3, greater than 0.5, greater than 0.7, greater than 1.0, greater than 1.2, greater than 1.5, greater than 1.7, or greater than 2.0. In terms of upper limits, the phenol to amine weight ratio may be less than 4.0, e.g., less than 3.5, less than 3.0, less than 2.7, less than 2.5, or less than 2.3.

As noted above, the disclosed components and concentrations allows for roughly a 1:1 volume mix ratio, which is convenient for deploying/applying the combined adhesive. In some cases, the volume ratio of the first part to the second part ranges from 0.2 to 5.0, e.g., from 0.3 to 4.0, from 0.5 to 3.0, from 0.5 to 2.5, from 0.7 to 1.5, or from 0.8 to 1.3. In terms of lower limits, the volume ratio of the first part to the second part may be greater than 0.2, e.g., greater than 0.3, greater than 0.5, greater than 0.7, greater than 0.8, or greater than 0.9. In terms of upper limits, the volume ratio of the first part to the second part may be less than 5.0, e.g., less than 4.0, less than 3.0, less than 2.5, less than 2.0, less than 1.5, or less than 1.3.

Multifunctional Amine Package

The multifunctional amine package comprises BHMT and a synergist. BHMT itself is a known chemical compound. Importantly, BHMT does not have cyclic moieties.

In some embodiments, the adhesive composition comprises less than 35 wt % cyclic amines, e.g., less than 30 wt %, less than 25 wt %, less than 20 wt %, less than 15 wt %, less than 10 wt %, less than 5 wt %, or less than 1 wt %. In some cases, the adhesive composition no cyclic amine content. In terms of ranges, the adhesive composition comprises from 0 wt % to 35 wt % cyclic amines, e.g., from 0.1 wt % to 35 wt %, from 0.1 wt % to 25 wt %, from 0.1 wt % to 10 wt %, from 1 wt % to 25 wt %, from 1 wt % to 10 wt %, from 0.1 wt % to 5 wt %, from 1 wt % to 5 wt %, or from 0.1 wt % to 3 wt %. Without being bound by theory, it is posited that the lack of bulky cyclic moieties on the amines of the multifunctional amine package (and in the adhesive composition as a whole) provides for improved interaction with the epoxy groups of the epoxy resin. This improved interaction provides for closer molecular interaction, which in turn provides for better sag resistance and/or viscosity control. By employing the disclosed multifunctional amine package that has little if any cyclic amine content, the adhesive compositions are able to achieve the aforementioned performance benefits.

In some cases, the hydrocarbon chains between the amino groups are beneficially long (versus, for example, ethylene or propylene amines), which may provide for improved inter-molecular interactions between polymer chains. In some cases, at least some of the hydrocarbon chains between the amino groups, comprise greater than 3 carbons, e.g., greater than 4, greater than 5, greater than 6, greater than 7, or greater than 8.

The cyclic amine content may also be characterized in terms of total amine content. In some cases, the adhesive composition comprises less than 75% cyclic amines, based on the total amine content (cyclic amine content/total amine content), e.g., less than 65%, less than 60%, less than 50%, less than 40%, less than 35%, less than 25%, less than 20%, less than 15%, less than 10%, less than 5%, or less than 1%. In terms of ranges, the adhesive composition comprises from 0% to 75% cyclic amines, based on total amine content, e.g., from 0.1% to 75%, from 0.1% to 50%, from 0.1% to 20%, from 1 wt % to 20%, from 1% to 10%, from 0.1% to 10%, from 0.1 wt % to 5%, or from 1% to 3%.

In some cases, the amine concentration is less than the epoxy resin concentration, e.g., at least 10% less than, at least 20% less than, at least 30% less than, at least 40% less than, at least 50% less than, at least 60% less than, at least 70% less than, at least 80% less than, or at least 90% less than.

The multifunctional amine package also comprises a synergist. It has been found that the combination of the synergist improves performance of the BHMT (and the interaction with the epoxy groups). The synergist may be present in the amounts disclosed above in relation to the BHMT.

The synergist may vary widely. In some cases, the synergist is a nitrogen-containing compound. In some embodiments, the synergist comprises acetonitrile, caprolactam, aminohexanol, or aminocephalosporanic acid, or combinations thereof. In some cases, the synergist comprises hexamethylenediamine (HMD), aminocapronitrile, or adiponitrile, or combinations thereof.

In some cases, the synergist may include aliphatic, cycloaliphatic or arylaliphatic primary diamines, such as ethylene diamine, 1,2-propane diamine, 1,3-propane diamine, 2-methyl-1,2-propane diamine, 2,2-dimethyl-1,3-propane diamine, 1,3-butane diamine, 1,4-butane diamine, 1,3-pentane diamine (DAMP), 1,5-pentane diamine, 1,5-diamino-2-methylpentane (MPMD), 2-butyl-2-ethyl-1,5-pentane diamine (C11-Neodiamine), 1,6-hexane diamine, 2,5-dimethyl-1,6-hexane diamine, 2,2,4- and 2,4,4-trimethylhexamethylene diamine (TMD), 1,7-heptane diamine, 1,8-octane diamine, 1,9-nonane diamine, 1,10-decane diamine, 1,11-undecane diamine, 1,12-dodecane diamine, 1,2-, 1,3- and 1,4-diaminocyclohexane, bis-(4-aminocyclohexyl) methane (H12-MDA), bis-(4-amino-3-methylcyclohexyl) methane, bis-(4-amino-3-ethylcyclohexyl)methane, bis-(4-amino-3,5-dimethylcyclohexyl)methane, bis-(4-amino-3-ethyl-5-methylcyclohexyl)methane (M-MECA), 1-amino-3-aminomethyl-3,5,5-trimethylcyclohexane (=isophorone diamine or IPDA), 2- and 4-methyl-1,3-diaminocyclohexane and mixtures thereof, 1,3- and 1,4-bis-(aminomethyl)cyclohexane, 2,5(2,6)-bis-(aminomethyl)bicyclo[2.2.1]heptane (NBDA), 3(4), 8(9)-bis-(aminomethyl) tricyclo[5.2.1.02,6]decane, 1,4-diamino-2,2,6-trimethylcyclohexane (TMCDA), 1,8-menthane diamine, 3,9-bis-(3-aminopropyl)-2,4,8,10-tetraoxaspiro[5.5]undecane as well as 1,3- and 1,4-bis-(aminomethyl)benzene.

In some cases, the synergist may include aliphatic, cycloaliphatic or arylaliphatic primary triamines like 4-aminomethyl-1,8-octane diamine, 1,3,5-tris-(aminomethyl)benzene, 1,3,5-tris-(aminomethyl)cyclohexane, tris-(2-aminoethyl)amine, tris-(2-aminopropyl)amine and tris-(3-aminopropyl)amine.

In some cases, the synergist may include aliphatic primary diamines containing ether groups, such as especially bis-(2-aminoethyl)-ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine and higher oligomers of these diamines, bis-(3-aminopropyl)polytetrahydrofurans and other polytetrahydrofuran diamines, as well as polyoxyalkylene diamines. The latter typically constitute products from the amination of polyoxyalkylene diols and are available for example under the names Jeffamine® (from Huntsman), under the name Polyetheramine (from BASF) or under the name PC Amine® (from Nitroil). Especially suitable polyoxyalkylene diamines are Jeffamine® D-230, Jeffamine® D-400, Jeffamine® D-2000, Jeffamine® D-4000, Jeffamine® XTJ-511, Jeffamine® ED-600, Jeffamine® ED-900, Jeffamine ED-2003, Jeffamine® XTJ-568, Jeffamine® XTJ-569, Jeffamine® XTJ-523, Jeffamine® XTJ-536, Jeffamine® XTJ-542, Jeffamine® XTJ-559, Jeffamine® EDR-104, Jeffamine® EDR-148, Jeffamine® EDR-176; Polyetheramine D 230, Polyetheramine D 400 and Polyetheramine D 2000, PC Amine® DA 250, PC Amine® DA 400, PC Amine® DA 650 and PC Amine® DA 2000.

In some cases, the synergist may include primary polyoxyalkylene triamines, which typically constitute products from the amination of polyoxyalkylene triols and are available for example under the name Jeffamine® (from Huntsman), under the name polyetheramine (from BASF) or under the name PC Amine® (from Nitroil), such as in particular Jeffamine® T-403, Jeffamine T-3000, Jeffamine® T-5000, Polyetheramine T 403, Polyetheramine T 5000 and PC Amine® TA 403.

In some cases, the synergist may include polyamines having tertiary amino groups with two primary aliphatic amino groups, such as in particular N,N'-bis-(aminopropyl)-piperazine, N,N-bis-(3-aminopropyl)methylamine, N,N-bis-(3-aminopropyl)ethylamine, N,N-bis-(3-aminopropyl)propylamine, N,N-bis-(3-aminopropyl)cyclohexylamine, N,N-bis-(3-aminopropyl)-2-ethyl-hexylamine, as well as the products from the double cyanoethylation and subsequent reduction of fatty amines, which are derived from natural fatty acids, such as N,N-bis-(3-aminopropyl)dodecylamine and N,N-bis-(3-aminopropyl) tallow-alkylamine, available as Triameen® Y12D and Triameen® YT (from Akzo Nobel).

In some cases, the synergist may include polyamines having tertiary amino groups with three primary aliphatic amino groups, such as in particular tris-(2-aminoethyl)amine, tris-(2-aminopropyl)amine and tris-(3-aminopropyl)amine; polyamines having secondary amino groups with two primary aliphatic amino groups, such as in particular 3-(2-aminoethyl)aminopropylamine, diethylene triamine (DETA), triethylene tetramine (TETA), tetraethylene pentamine (TEPA), pentaethylene hexamine (PEHA) and higher homologues of linear polyethylene amines like polyethylene polyamine with 5 to 7 ethylene amine units (so-called "higher ethylene-polyamines", HEPA), products from the multiple cyanoethylation or cyanobutylation and subsequent hydrogenation of primary di- and polyamines with at least two primary amino groups, such as dipropylene triamine (DPTA), N-(2-aminoethyl)-1,3-propane diamine (N3-amine), N,N'-bis(3-aminopropyl)ethylene diamine (N4-amine), N,N'-bis-(3-aminopropyl)-1,4-diaminobutane, N5-(3-aminopropyl)-2-methyl-1,5-pentane diamine, N3-(3-aminopentyl)-1,3-pentane diamine, N5-(3-amino-1-ethylpropyl)-2-methyl-1,5-pentane diamine and N,N'-bis-(3-amino-1-ethylpropyl)-2-methyl-1,5-pentane diamine.

In some cases, the synergist may include polyamines having one primary and one secondary amino group, such as in particular N-methyl-1,2-ethane diamine, N-ethyl-1,2-ethane diamine, N-butyl-1,2-ethane diamine, N-hexyl-1,2-ethane diamine, N-(2-ethylhexyl)-1,2-ethane diamine, N-cyclohexyl-1,2-ethane diamine, 4-aminomethyl-piperidine, N-(2-aminoethyl)piperazine, N-methyl-1,3-propane diamine, N-butyl-1,3-propane diamine, N-(2-ethylhexyl)-1,3-propane diamine, N-cyclohexyl-1,3-propane diamine, 3-methylamino-1-pentylamine, 3-ethylamino-1-pentylamine, 3-cyclohexylamino-1-pentylamine, fatty diamines like N-cocoalkyl-1,3-propane diamine and products from the Michael-type addition reaction of primary aliphatic diamines with acrylonitrile, maleic or fumaric acid diesters, citraconic acid diesters, acrylic and methacrylic acid esters, acrylic and methacrylic acid amides and itaconic acid diesters, reacted in a molar ratio of 1:1, and also products from the partial reductive alkylation of primary aliphatic polyamines with benzaldehyde or other aldehydes or ketones, as well as partially styrolized polyamines like Gaskamine® 240 (from Mitsubishi Gas Chemical (MGC)).

In some cases, the synergist may include aromatic polyamines, especially such as m- and p-phenylene diamine, 4,4'-, 2,4' and 2,2'-diaminodiphenylmethane, 3,3'-dichloro-4,4'-diaminodiphenylmethane (MOCA), 2,4- and 2,6-toluylene diamine, mixtures of 3,5-dimethylthio-2,4- and -2,6-toluylene diamine (available as Ethacure® 300 from Albemarle), mixtures of 3,5-diethyl-2,4- and -2,6-toluylene diamine (DETDA), 3,3',5,5'-tetraethyl-4,4'-diaminodiphenylmethane (M-DEA), 3,3',5,5'-tetraethyl-2,2'-dichloro-4,4'-diaminodiphenylmethane (M-CDEA), 3,3'-diisopropyl-5,5'-dimethyl-4,4'-diaminodiphenylmethane (M-MIPA), 3,3',5,5'-tetraisopropyl-4,4'-diaminodiphenylmethane (M-DIPA), 4,4'-diaminodiphenylsulfone (DDS), 4-amino-N-(4-aminophenyl)benzene sulfonamide, 5,5'-methylene dianthranilic acid, dimethyl-(5,5'-methylene dianthranilate), 1,3-propylene-bis-(4-aminobenzoate), 1,4-butylene-bis-(4-aminobenzoate), polytetramethylene oxide-bis-(4-aminobenzoate) (available as Versalink® from Air Products), 1,2-bis-(2-aminophenylthio)ethane, 2-methylpropyl-(4-chloro-3,5-diaminobenzoate) and tert·butyl-(4-chloro-3,5-diaminobenzoate).

In some cases, the synergist may include adducts of the mentioned polyamines with epoxides and epoxy resins, especially adducts with diepoxides in a molar ratio of at least 2/1, adducts with monoepoxides in a molar ratio of at least 1/1, and reaction products from amines and epichlorhydrin, especially that of 1,3-bis-(aminomethyl)benzene, commercially available as Gaskamine® 328 (from MGC).

In some cases, the synergist may include polyamidoamines, which constitute reaction products of a monovalent or polyvalent carboxylic acid, or its esters or anhydrides, especially a dimer fatty acid, and an aliphatic, cycloaliphatic or aromatic polyamine used in stoichiometric excess, especially a polyalkylene amine such as DETA or TETA, especially the commercially available polyamidoamines Versamid® 100, 125, 140 and 150 (from Cognis), Aradur® 223, 250 and 848 (from Huntsman), Euretek® 3607 and 530 (from Huntsman) and Beckopox® EH 651, EH 654, EH 655, EH 661 and EH 663 (from Cytec).

In some cases, the synergist may include phenalkamines, also known as Mannich bases, which constitute reaction products of a Mannich reaction of phenols, especially cardanol, with aldehydes, especially formaldehyde, and polyamines, especially the commercially available phenalkamines Cardolite® NC-541, NC-557, NC-558, NC-566, Lite 2001 and Lite 2002 (from Cardolite), Aradur® 3440, 3441, 3442 and 3460 (from Huntsman) and Beckopox® EH 614, EH 621, EH 624, EH 628 and EH 629 (from Cytec).

In cases where the synergist may be a cyclic amine, the cyclic amine is present in the lower amounts disclosed herein.

The adhesive composition may comprise from 1 wt % to 35 wt % multifunctional amine package, based on the total weight of the adhesive composition (including solvent), e.g., from 1 wt % to 30 wt %, from 2 wt % to 25 wt %, from 5 wt % to 20 wt %, from 7 wt % to 20 wt %, from 10 wt % to 20 wt %, or from 12 wt % to 18 wt %. In terms of lower limits, the adhesive composition may comprise greater than 1 wt % multifunctional amine package, e.g., at least 2 wt %, at least 5 wt %, at least 7 wt %, at least 10 wt %, or at least 12 wt %. In terms of upper limits, the adhesive composition may comprise less than 35 wt % multifunctional amine package, e.g., less than 25 wt %, less than 20 wt %, less than 18 wt %, or less than 17 wt %. Beneficially, these amounts of multifunctional amine package have been found to unexpectedly contribute to the aforementioned performance benefits. Conventional coating compositions employ different amounts, e.g., higher amounts, of (cyclic) triamines, and, as such, do not demonstrate these performance benefits.

In some cases, the multifunctional amine package may comprise BHMT in an amount ranging from 30 wt % to 90 wt % wt %, based on the total weight of the multifunctional amine package, e.g., from 35 wt % to 80 wt %, from 40 wt % to 75 wt %, from 45 wt % to 70 wt %, from 50 wt % to 65 wt %, or from 52 wt % to 57 wt %. In terms of lower limits, the multifunctional amine package may comprise greater than 30 wt % BHMT, e.g., greater than 35 wt %, greater than 40 wt %, greater than 45 wt %, greater than 50 wt %, greater than 55 wt %, greater than 60 wt %, greater than 65 wt %, greater than 70 wt %, greater than 75 wt %, or greater than 80 wt %. In terms of upper limits, the multifunctional amine package may comprise less than 90 wt % BHMT, e.g., less than 85 wt %, less than 80 wt %, less than 75 wt %, less than 70 wt %, less than 65 wt %, less than 60 wt %, less than 55 wt %, less than 50 wt %, less than 45 wt %, or less than 40 wt %.

The multifunctional amine package may comprise the synergist in an amount ranging from 10 wt % to 70 wt %, based on the total weight of the multifunctional amine package, e.g., from 15 wt % to 65 wt %, from 20 wt % to 60 wt %, from 25 wt % to 55 wt %, from 30 wt % to 50 wt %, or from 35 wt % to 45 wt %. In terms of lower limits, the multifunctional amine package may comprise greater than 10 wt % synergist, e.g., greater than 15 wt %, greater than 20 wt %, greater than 25 wt %, greater than 30 wt %, greater than 35 wt %, greater than 40 wt %, greater than 45 wt %, greater than 50 wt %, or greater than 55 wt %. In terms of upper limits, the multifunctional amine package may comprise less than 70 wt % synergist, e.g., less than 65 wt %, less than 60 wt %, less than 55 wt %, less than 50 wt %, less than 45 wt %, less than 40 wt %, less than 35 wt %, less than 30 wt %, less than 25 wt %, less than 20 wt %, less than 15 wt %, or less than 10 wt %. These ranges and limits are applicable to the synergist as a whole and also to the specific chemicals individually.

The synergist was caprolactam, low amounts, e.g., less than 15 wt %, of aminocapronitrile, HMD, adiponitrile, acetonitrile, aminohexanol, or aminocephalosporanic acid, or combinations thereof, and optional organics in even smaller amounts.

Commercial Examples include FlexaTram® BHM L-500 or BHM-120 from Ascend Performance Materials.

Epoxy Resin

The adhesive composition comprises an epoxy resin. In some cases, the epoxy resin is a component of the first part. Epoxy resins are well known, and the epoxy resins used herein may vary widely.

In some cases, the adhesive composition comprises from 40 wt % to 90 wt % epoxy resin, based on the total weight of the adhesive composition (including solvent), e.g., from 45 wt % to 80 wt %, from 45 wt % to 75 wt %, from 50 wt % to 74 wt %, or from 52 wt % to 73 wt %. In terms of lower limits, the adhesive composition may comprise greater than 40 wt % epoxy resin, e.g., greater than 45 wt %, greater than 50 wt %, or greater than 52 wt %. In terms of upper limits, the adhesive composition may comprise less than 90 wt %, e.g., less than 80 wt %, less than 75 wt %, less than 74 wt %, or less than 73 wt %.

Exemplary epoxy resins may include, but are not limited to, the following example compounds. In some cases, the epoxy resins are formed from the oxidation of the corresponding olefins or from the reaction of epichlorhydrin with the corresponding polyols, polyphenols or amines.

In some cases, the epoxy resin comprises polyepoxide liquid resins. These have a glass transition temperature which usually lies below 25° C., in contrast with so-called solid resins, which have a glass transition temperature above 25° C. and can be comminuted into powders which are pourable up to 25° C.

In some cases, the epoxy resin comprises an aromatic polyepoxide. Suitable for this, for example, are liquid resins of formula (II)

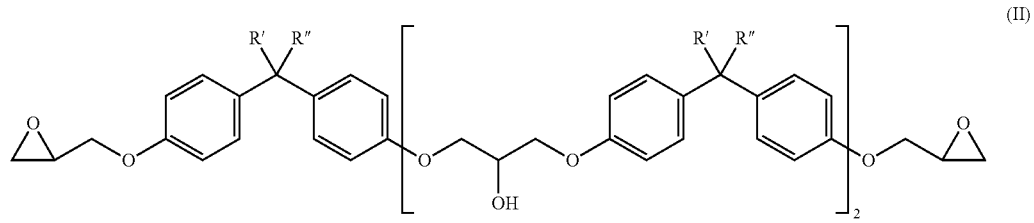

where R' and R" independently of one another each stand for a hydrogen atom or a methyl group, and s on average stands for a value of 0 to 1. Preferable are such liquid resins of formula (II) for which the index s on average stands for a value of less than 0.2.

In some cases, the resins of formula (II) are diglycidyl ethers of bisphenol-A, bisphenol-F and bisphenol-A/F, where A stands for acetone and F for formaldehyde, which serve as educts for the production of these bisphenols. A bisphenol-A liquid resin accordingly has methyl groups, a bisphenol-F liquid resin hydrogen atoms, and a bisphenol-A/F liquid resin both methyl groups and hydrogen atoms as R' and R" in formula (II). In the case of bisphenol-F, positional isomers can also be present, especially those derived from 2,4'- and 2,2'-hydroxyphenylmethane.

Other suitable aromatic liquid resins are the glycidylization products of dihydroxybenzene derivatives such as resorcin, hydroquinone and pyrocatechol; other bisphenols or polyphenols like bis-(4-hydroxy-3-methylphenyl)-methane, 2,2-bis-(4-hydroxy-3-methylphenyl)-propane (bisphenol-C), bis-(3,5-dimethyl-4-hydroxyphenyl)-methane, 2,2-bis-(3,5-dimethyl-4-hydroxyphenyl)-propane, 2,2-bis-(3,5-dibromo-4-hydroxyphenyl)-propane, 2,2-bis-(4-hydroxy-3-tert·-butylphenyl)-propane, 2,2-bis-(4-hydroxyphenyl)-butane (bisphenol-B), 3,3-bis-(4-hydroxyphenyl)-pentane, 3,4-bis-(4-hydroxyphenyl)-hexane, 4,4-bis-(4-hydroxyphenyl)-heptane, 2,4-bis-(4-hydroxyphenyl)-2-methylbutane, 2,4-bis-(3,5-dimethyl-4-hydroxyphenyl)-2-methylbutane, 1,1-bis-(4-hydroxyphenyl)-cyclohexane (bisphenol-Z), 1,1-bis-(4-hydroxyphenyl)-3,3,5-trimethylcyclohexane (bisphenol-TMC), 1,1-bis-(4-hydroxyphenyl)-1-phenylethane, 1,4-bis[2-(4-hydroxyphenyl)-2-propyl]-benzene) (bisphenol-P), 1,3-bis-[2-(4-hydroxyphenyl)-2-propyl]-benzene) (bisphe-nol-M), 4,4'-dihydroxydiphenyl (DOD), 4,4'-dihydroxybenzophenone, bis-(2-hydroxynaphth-1-yl)-methane, bis-(4-hydroxynaphth-1-yl)-methane 1,5-dihydroxy-naphthaline, tris-(4-hydroxyphenyl)-methane, 1,1,2,2-tetrakis-(4-hydroxyphenyl)-ethane, bis-(4-hydroxyphenyl)-ether, bis-(4-hydroxyphenyl)sulfone.

In some cases, the epoxy resin comprises condensation products of phenols with formaldehyde, which are obtained under acidic conditions, such as phenol Novolaks or cresol Novolaks, also known as bisphenol-F Novolaks and aromatic amines, like aniline, toluidine, 4-aminophenol, 4,4'-methylene diphenyldiamine (MDA), 4,4'-methylene diphenyldi-(N-methyl)-amine, 4,4'-[1,4-phenylene-bis-(1-methyl-ethylidene)]-bisaniline (bisaniline-P), 4,4'-[1,3-phenylene-bis-(1-methyl-ethylidene)]-bisaniline (bisaniline-M).

In some cases, the epoxy resin comprises an aliphatic or cycloaliphatic polyepoxide, such as a glycidyl ether of a saturated or unsaturated, branched or unbranched, cyclical or open-chain C2- to C30-diol, such as ethylene glycol, propylene glycol, butylene glycol, hexane diol, octane diol, a polypropylene glycol, dimethylol cyclohexane, neopentylglycol or dibromo-neopentylglycol; a glycidyl ether of a tri- or tetrafunctional, saturated or unsaturated, branched or unbranched, cyclical or open-chain polyol, such as ricin oil, trimethylol propane, trimethylol ethane, pentaerythrol, sorbitol or glycerine, as well as alkoxylated glycerine or alkoxylated trimethylol propane; a hydrogenatec bisphenol-A, -F or -A/F liquid resin, or the glycidylization products of hydrogenated bisphenol-A, -F or -A/F, a N-glycidyl derivative of amides or heterocyclical nitrogen bases, such as triglycidyl cyanurate and triglycidyl isocyanurate, as well as reaction products of epichlorhydrin and hydantoin.

In some cases, the epoxy resin comprises a bisphenol-A, -F or -A/F solid resin, which is of similar structure to the already mentioned liquid resins of formula (II), but having a value of 2 to 12 instead of the index s, and having a glass transition temperature above 25° C.

In some cases, the epoxy resin comprises epoxy resins from the oxidation of olefins, such as from the oxidation of vinylcyclohexene, dicyclopentadiene, cyclohexadiene, cyclododecadiene, cyclododecatriene, isoprene, 1,5-hexadiene, butadiene, polybutadiene or divinylbenzene.

An exemplary commercial product is DER 362, a bisphenol-based epoxy resin from Olin Corporation.

Rheology Modifier

The adhesive composition comprises rheology modifier. In some cases, the rheology modifier is a component of the second part. Rheology modifiers are well known, and the rheology modifiers used herein may vary widely.

In some cases, the adhesive composition comprises from 0 wt % to 20 wt % rheology modifier, based on the total weight of the adhesive composition, e.g., from 0.1 wt % to 20 wt %, from 0.1 wt % to 15 wt %, from 0.2 wt % to 10 wt %, from 0.5 wt % to 5 wt %, or from 1 wt % to 5 wt %. In terms of lower limits, the adhesive composition may comprise greater than 0.1 wt % rheology modifier, e.g., greater than 0.2 wt %, greater than 0.5 wt %, greater than 0.7 wt % greater than 1.0 wt %, or greater than 1.5 wt %. In terms of upper limits, the adhesive composition may comprise less than 20 wt % rheology modifier, e.g., less than 15 wt %, less than 10 wt %, less than 7 wt %, or less than 5 wt %.

These amounts have been found to synergistically contribute to sag resistance performance (and to adhesive performance).

Exemplary rheology modifiers may include, but are not limited to, thickening agents, e.g., (pyrogenic and/or fumed) silica, sheet silicates like bentonites, derivatives of ricin oil, hydrogenated ricin oil, polyamides, polyurethanes, urea compounds, silicic acids, cellulose ether and hydrophobically modified polyoxyethylenes. In some cases, the rheology modifier comprises silica. Exemplary commercial products include Ca-b-OSil®, from Cabot Corporation.

Solvent

The adhesive composition, in some cases, may comprise a solvent. In some embodiments, the second part may comprise a solvent.

The adhesive composition comprises solvent. In some cases, the solvent is a component of the second part. Solvents are generally not employed in significant amounts due to the desire to reduce emissions.

The solvent of the adhesive composition may vary widely. In some cases, the solvent comprises a phenol, e.g., nonyl phenol. In some cases, some solvents, e.g., nonyl phenol, may also contribute to the epoxy-amine reaction, e.g., as a crosslinker/accelerator.

In some cases, the adhesive composition comprises from 0 wt % to 50 wt % solvent modifier, based on the total weight of the adhesive composition, e.g., from 1 wt % to 50 wt %, from 3 wt % to 45 wt %, from 5 wt % to 40 wt %, from 7 wt % to 38 wt %, from 8 wt % to 35 wt %, or from 10 wt % to 30 wt %. In terms of lower limits, the adhesive composition may comprise greater than 1 wt % solvent, e.g., greater than 3 wt %, greater than 5 wt %, greater than 7 wt % greater than 8 wt %, or greater than 9 wt %. In terms of upper limits, the adhesive composition may comprise less than 50 wt % solvent, e.g., less than 45 wt %, less than 40 wt %, less than 38 wt %, or less than 35 wt %.

In some embodiments, unlike some conventional coating compositions, some of the aforementioned solvents, e.g., phenols, remain as a component of the adhesive composition.

Other Possible Additives

Other additives may be included in the adhesive composition. Examples include adjuvants, solvents, thinners, polymers, fillers, pigments, stabilizers, flame retardants, biocides, antimicrobial/antiviral additives, adhesive promoters, film forming aids, and extenders.

Exemplary thinners include reactive thinners, especially reactive thinners having epoxy groups, such as have been previously mentioned, epoxidated soy oil or linseed oil, compounds having acetoacetate groups, especially acetoacetylated polyols, butyrolactone, carbonates, aldehydes, and also isocyanates and silicones having reactive groups.

Exemplary polymers include polyamides, polysulfides, polyvinylformal (PVF), polyvinylbutyral (PVB), polyurethanes (PUR), polymers with carboxyl groups, polyamides, butadiene-acrylonitrile copolymers, styrene-acrylonitrile copolymers, butadiene-styrene copolymers, homo- or copolymers of unsaturated monomers, especially from the group comprising ethylene, propylene, butylene, isobutylene, isoprene, vinylacetate and alkyl(meth)acrylates, especially chlorosulfonated polyethylenes and fluorine-containing polymers, sulfonamide-modified melamines and purified Montan waxes.

Exemplary filler include inorganic and organic fillers, such as ground or precipitated calcium carbonates, which are optionally coated with fatty acids, especially stearates, barite (heavy spar), talcs, ground quartz, quartz sand, micaceous iron ore, dolomites, wollastonites, kaolins, mica (potassium aluminum silicate), molecular sieves, aluminum oxides, aluminum hydroxides, magnesium hydroxide, silicic acids, cements, gypsum, fly ash, soot, graphite, metal powder such as aluminum, copper, iron, zinc, silver or steel, PVC powder or hollow spheres; fibers, especially glass fibers, carbon fibers, metal fibers, ceramic fibers or plastic fibers like polyimide fibers or polyethylene fibers.

Exemplary pigments include titanium dioxide and iron oxides.

Exemplary adhesive promoters include organoalkoxysilanes like aminosilanes, mercaptosilanes, epoxysilanes, vinylsilanes, (meth)acrylosilanes, isocyanatosilanes, carbamatosilanes, alkylsilanes, S-(alkylcarbonyl)-mercaptosilanes and aldiminosilanes, as well as oligomeric forms of these silanes, especially 3-glycidoxypropyltrimethoxysilane, 3-aminopropyltrimethoxysilane, N-(2-aminoethyl)-3-aminopropyl-trimethoxysilane, N-(2-aminoethyl)-N'[3-(trimethoxysilyl)propyl]ethylene diamine, 3-mercaptopropyltrimethoxysilane, 3-isocyanatopropyltrimethoxysilane, 3-ureidopropyltrimethoxysilane, 3-chloropropyltrimethoxysilane, vinyltrimethoxysilane, or the corresponding organosilanes with ethoxy groups instead of the methoxy groups.

Exemplary stabilizers include stabilizers to oxidation, heat, light and UV radiation.

Exemplary flame retardants include aluminum hydroxide ($Al(OH)_3$; also known as ATH for "aluminum trihydrate"), magnesium hydroxide ($Mg(OH)_2$; also called MDH for "magnesium dihydrate"), ammonium sulfate (($NH_4)_2SO_4$), boric acid ($B(OH)_3$), zinc borate, zinc phosphate, melamine borate and melamine cyanurate; phosphorus-containing compounds such as ammonium phosphate (($NH_4)_3PO_4$), ammonium polyphosphate, melamine phosphate, melamine pyrophosphate, triphenylphosphate, diphenylcresylphosphate, tricresylphosphate, triethylphosphate, tris-(2-ethylhexyl)phosphate, trioctylphosphate, mono-, bis- and tris-(isopropylphenyl)phosphate, resorcinol-bis (diphenylphosphate), resorcinol-diphosphate oligomer, tetraphenyl-resorcinol-diphosphite, ethylene diamine diphosphate and bisphenol-A-bis (diphenylphosphate); halogen-containing compounds such as chloroalkylphosphates, especially tris-(chloroethyl)phosphate, tris-(chloropropyl)phosphate and tris-(dichloroisopropyl)phosphate, polybrominated diphenylether, especially decabromodiphenylether, polybrominated diphenyloxide, tris-[3-bromo-2,2-bis(bromomethyl)propyl]phosphate, tetrabromo-bisphenol-A, bis-(2,3-dibromopropyl ether) of bisphenol A, brominated epoxy resins, ethylene-bis(tetrabromophtalimide), ethylene-bis (dibromonorbornane dicarboximide), 1,2-bis-(tribromophenoxy)ethane, tris-(2,3-dibromopropyl)isocyanurate, tribromophenol, hexabromocyclododecane, bis-(hexachlorocyclopentadieno)cyclooctane and chloroparaffins; as well as combinations of a halogen-containing compound and antimony trioxide ($Sb_2O_3$) or antimony pentoxide ($Sb_2O_5$).

Exemplary include surfactants, such as in particular cross-linking agents, leveling agents, deaerating agents or defoamers.

Exemplary biocides include algicides, fungicides, antimicrobial compounds, antiviral compounds.

As used herein, "greater than" and "less than" limits may also include the number associated therewith. Stated another way, "greater than" and "less than" may be interpreted as "greater than or equal to" and "less than or equal to." It is contemplated that this language may be subsequently modified in the claims to include "or equal to." For example, "greater than 4.0" may be interpreted as, and subsequently modified in the claims as "greater than or equal to 4.0."

These components mentioned herein may be considered optional. In some cases, the disclosed compositions may expressly exclude one or more of the aforementioned components in this section, e.g., via claim language. For example claim language may be modified to recite that the disclosed compositions, processes, etc., do not utilize or comprise one or more of the aforementioned components, e.g., the compositions do not include a leveling agent.

Process for Making

The disclosure also relates to a process for making an adhesive composition. The process comprises the step of dissolving in a solvent the multifunctional amine package to form the second part and contacting the second part with the first part comprising an epoxy resin to form the adhesive composition. The process may further comprise the step of adding the rheology modifier to the second part, such that the second part has a viscosity as disclosed above.

Performance

In some embodiments, the adhesive compositions demonstrate a sag resistance greater than 10 mm, as measured via ASTM D4400 (current year), e.g., greater than 20 mm, greater than 30 mm, greater than 40 mm, greater than 50 mm, greater than 60 mm, greater than 70 mm, greater than 80 mm, greater than 90 mm, or greater than 100 mm. In terms of upper limits, the adhesive compositions may demonstrate a sag resistance less than 300 mm, e.g., less than 250 mm, less than 200 mm, less than 150 mm, less than 120 mm, less than 100 mm, less than 75 mm, less than 60 mm, less than 50 mm, or less than 40 mm. The adhesive compositions may demonstrate a sag resistance ranging from 10 mm to 300 mm, e.g., from 10 mm to 300 mm, from 15 mm to 120 mm, from 15 mm to 75 mm, or from 00 mm to 60 mm. Sag resistance may be carried out by applying mixed material onto a Leneta chart, Form 2C, drawing material down using a sag resistance bar, immediately standing the chart vertically, and testing to ASTM D4400. Once material cures, sag resistance can be rated by assessing the thickness of the film corresponding to that which just showed no sagging.

In some embodiments, the adhesive compositions demonstrate a cross hatch adhesion score greater than 1, as measured via ASTM D3359 B (current year), e.g., greater than 2, greater than 3, or greater than 4. In terms of ranges, the adhesive compositions demonstrate a cross hatch adhesion score ranging from 1 to 5, e.g., from 2 to 5, from 2 to 4, from 3 to 5, or from 3 to 4. Cross hatch adhesion may be rated using the ASTM adhesion 0-5 scale, where 0=poor adhesion, 5=excellent adhesion.

In some embodiments, the adhesive compositions has a hydrogen active equivalent weight less than 85, e.g., less than 80, less than 75, less than 70, less than 65, less than 60, less than 58, less than 57, less than 55, or less than 50. In terms of lower limits, the adhesive compositions may have a hydrogen active equivalent weight greater than 1, e.g., greater than 5, greater than 10, greater than 15, greater than 20, greater than 25, greater than 30, greater than 35, greater than 40, greater than 45, greater than 48, or greater than 50.

In some embodiments, the adhesive compositions demonstrate a gel time greater than 10 minutes, e.g., greater than 12 minutes, greater than 15 minutes, greater than 20 minutes, or greater than 25 minutes. In terms of upper limits, the adhesive composition demonstrates a gel time less than 100 minutes, e.g., less than 75 minutes, less than 50 minutes, less than 35 minutes, less than 30 minutes, less than 20 minutes, or less than 15 minutes. In some cases, gel time may be determined by mixing a 120 gram sample, placing the sample into a Gardco gel timer and measuring the time to gel relative to the time immediately before mixing.

In some embodiments, the adhesive compositions, when cured, demonstrate yellowing index greater than 1, e.g., greater than 2, greater than 3, greater than 4, greater than 5, greater than 6, greater than 7, greater than 8, greater than 9, or greater than 10. In some cases, the adhesive compositions, when cured, demonstrate yellowing index less than 9, e.g., less than 8, less than 7, less than 6, less than 5, less than 4, less than 3, less than 2, less than 1, or less than 0.5. Yellowing index may be measured via ASTM Method E313 (current year). Other color metrics are also contemplated and, in some embodiments, these can be used to differentiate the darker color of the disclosed adhesive. This is beneficial as an adhesive, where color quality is less important. This results in production and economic efficiencies, e.g., reduction in the need for purification to adjust color.

In some embodiments, the adhesive compositions have a viscosity ranging from 100 cps to 2000 cps, e.g., from 200 cps to 1800 cps, from 400 cps to 1600 cps, from 600 cps to 1400 cps, from 700 cps to 1300 cps, from 800 cps to 1200 cps, from 900 cps to 1100 cps, or from 900 cps to 1000 cps. In terms of lower limits, the adhesive compositions may have a viscosity greater than 100 cps, e.g., greater than 200 cps, greater than 400 cps, greater than 600 cps, greater than 700 cps, greater than 800 cps, or greater than 900 cps. In terms of upper limits, the adhesive compositions may have a viscosity less than 2000 cps, e.g., less than 1800 cps, less than 1600 cps, less than 1400 cps, less than 1300 cps, less than 1200 cps, less than 1100 cps, or less than 1000 cps. Viscosity (typically in centipoise) may be was measured, e.g., immediately after mixing of the two parts, using a Brookfield, RV, model DV3T, testing with spindle 2 at speed 20.

In some embodiments, the adhesive compositions demonstrate a Koenig hardness, as measured via ASTM D4366 (current year). Koenig hardness may be measured by applying films of the adhesive compositions onto pre-cleaned 3"×6" aluminum panels using a #60 wire-wound bar, e.g., at a wet film thickness of 6 mils. Koenig hardness may be measured after one, two, four and fourteen days cure, using a BYK Pendulum Hardness Tester, model 5856. In some cases, the adhesive compositions demonstrate a Koenig hardness (1 day) greater than 2, e.g., greater than 3, greater than 3.5, greater than 5, greater than 7, greater than 10, greater than 12, greater than 15, greater than 17, or greater than 18. In some cases, the adhesive compositions demonstrate a Koenig hardness (2 day) greater than 2, e.g., greater than 3, greater than 3.5, greater than 5, greater than 7, greater than 10, greater than 12, greater than 15, greater than 17, greater than 20, greater than 22, greater than 25, or greater than 26. In some cases, the adhesive compositions demonstrate a Koenig hardness (4 day) greater than 10, e.g., greater than 15, greater than 18, greater than 20, greater than 22, greater than 25, greater than 27, greater than 30, greater than 32, greater than 35, greater than 37, greater than 40, or greater than 41. In some cases, the adhesive compositions demonstrate a Koenig hardness (4 day) greater than 30, e.g., greater than 35, greater than 40, greater than 42, greater than 45, greater than 47, greater than 50, greater than 55, greater than 60, greater than 62, greater than 65, greater than 67, or greater than 69.

In some embodiments, the adhesive compositions demonstrate good blush resistance, e.g., a combination of high gloss, no residual tack, and/or excellent water spot resistance. Generally, coatings with high gloss, no residual tack and excellent water spot resistance are considered to have good blush resistance.

In some embodiments, tackiness may be determined by mixing the parts and performing a drawdown on a Form 2C Leneta card, e.g., using a 5 mil bird bar applicator. The applied coating is allowed to cure at room temperature. Tackiness of the film was rated using a 1-5 scale as follows:
1. Very Tacky, large amount of film exudation
2. Tacky, some film exudation
3. Tacky, no film exudation
4. Slight Tack, no exudation
5. No Tack, no exudation.

In some cases, the adhesive compositions demonstrate a tackiness greater than 1, e.g., greater than 1.5, greater than 2, greater than 2.5, greater than 3, greater than 3.5, greater than 4, greater than 4.5, or greater than 4.9.

In some embodiments, the adhesive compositions demonstrate a water spot testing. Water spot testing was carried out, placing a drop of water on the film for one hour, then wiping and immediately rating the appearance change of the coating. A 1-5 rating scale was used, where 5 indicates no change and 1 represents a significant appearance change. In some cases, the adhesive compositions demonstrate a water spot resistance less than 5, e.g., less than 4.5, less than 4, less than 3.5, less than 3, less than 2.5, less than 2, less than 1.5, or less than 1. In some cases, the adhesive compositions demonstrate a water spot resistance greater than 1, e.g., greater than 1.5, greater than 2, greater than 2.5, greater than 3, greater than 3.5, greater than 4, greater than 4.5, or greater than 4.9.

In some embodiments, the adhesive compositions demonstrate a gloss. Gloss may be determined by preparing (and curing) films then measuring at 60°. Gloss measurements may be taken using a BYK micro-TRI-gloss meter, model 4446. In some cases, the adhesive compositions demonstrate a gloss greater than 20, e.g., greater than 25, greater than 30, greater than 31, greater than 35, greater than 40, greater than 50, greater than 60, greater than 65, greater than 70, greater than 75, greater than 77, greater than 80, or greater than 82.

Examples

Two part adhesive compositions (Examples 1-5) were prepared using the compositions shown in Table 1. The multifunctional amine packages were FlexaTram® BHM L-500 or BHM-120 from Ascend Performance Materials. The multifunctional amine packages comprised BHM and synergist. The synergist was caprolactam, low amounts, e.g., less than 15 wt %, of aminocapronitrile, HMD, adiponitrile, acetonitrile, aminohexanol, or aminocephalosporanic acid, or combinations thereof, and optional organics in even smaller amounts. The epoxy was D.E.R. 331; D.E.R. 362; and/or D.E.R. 731 from Olin. The solvent was nonylphenol. The additive (rheology modifier) was Cab-O-Sil from Cabot Corporation.

For Examples 1-3, a first part (epoxy part) was measured and set aside. The second part (amine part) was prepared by preheating the multifunctional amine package, adding the heated amine to the solvent (nonylphenol), and mixing at medium speed until homogeneous. The mixture was cooled. Additives, e.g., rheology modifier, were then added and dispersed to obtain the second part, which was a smooth gel. The first and second parts were then mixed by hand to yield the adhesive composition.

Examples 4 and 5 were prepared in a similar manner, with the exception that the second part was prepared by blending the multifunctional amine package and the solvent and mixing at medium speed until homogeneous.

TABLE 1

Example Compositions

| | | Second Part | | |
|---|---|---|---|---|
| Component | First Part Epoxy | Mult. Am. Pack. (BHM + synergist) | Solvent | Additives |
| Ex. 1 | 54 (362) | 17 (B-120) | 26 | 2 (RM) |
| Ex. 2 | 54 (362) | 17 (B-120) | 26 | 3 |
| Ex. 3 | 54 (362) | 17 (B-120) | 25 | 4 |
| Ex. 4 | 54 (331/731) | 13 (L-500) | 30 | 3 |
| Ex. 5 | 69 (331/731) | 17 (L-500) | 10 | 3 |

Some samples were tested for AHEW, sag resistance, adhesion, gel time, and viscosity using the test methods disclosed herein. The results are shown in Table 2a.

TABLE 2a

Test Results

| Component | AHEW | Sag resis., mils | Adhesion | Gel Time | Solvent: Amine | Viscosity, cps |
|---|---|---|---|---|---|---|
| Ex. 1 | 57.4 | 20 | | 26 | 1.5 | |
| Ex. 2 | 57.4 | 60+ | 5B* | 17 | 1.5 | |
| Ex. 3 | 57.4 | 60+ | 5B** | 25 | 1.5 | |
| Ex. 4 | 49 | <60 | | 17 | 2.25 | 942 |
| Ex. 5 | 49 | <60 | | 19 | 0.6 | 942 |

*5B cross hatch score was achieved for multiple substrates: concrete brick, wood, sandblasted steel, glazed ceramic tile (back), polystyrene roofing panel, and particle board.
**5B cross hatch score was achieved for multiple substrates: concrete brick, wood, sandblasted steel (4B score for Ex. 5), glazed ceramic tile (back), polystyrene roofing panel, and particle board.

Some samples were tested for tackiness, water spot resistance and 60 degree gloss, using the test methods disclosed herein. The results are shown in Table 2b.

TABLE 2b

Test Results (ctd.)

| Component | Tackiness | Water Spot Resis. | Gloss, 60 degree | Hardness, 1 day | Hardness, 2 day | Hardness, 4 day | Hardness, 14 day |
|---|---|---|---|---|---|---|---|
| Ex. 4 | 5 | 5 | 84 | 18.9 | 27.0 | 41.5 | 47.2 |
| Ex. 5 | 2 | 3 | 32 | 4.0 | 5.5 | 27.3 | 69.5 |

Embodiments

The following embodiments are contemplated. All combinations of features and embodiments are contemplated.

Embodiment 1: an adhesive composition comprising a first part comprising an epoxy resin; and a second part comprising a multifunctional amine package comprising bis(hexamethylene)triamine and a synergist; wherein the amine concentration is at least 10% less than the epoxy resin concentration, and wherein the adhesive composition demonstrates a sag resistance ranging from 10 mm to 300 mm or greater than 40 mm.

Embodiment 2: an embodiment of embodiment 1, wherein the synergist comprises acetonitrile, caprolactam, aminohexanol, or aminocephalosporanic acid, or combinations thereof.

Embodiment 3: an embodiment of embodiments 1 or 2, wherein the adhesive composition comprises less than 75% cyclic amines, based on the total amine content.

Embodiment 4: an embodiment of any of embodiments 1-3, wherein the solvent to bis(hexamethylene)triamine weight ratio ranges from 0.1 to 4.0.

Embodiment 5: an embodiment of any of embodiments 1-4, wherein the volume ratio of the first part to the second part ranges from 0.2 to 5.

Embodiment 6: an embodiment of any of embodiments 1-5, wherein the adhesive composition, when mixed, has a viscosity less than 1500 cps.

Embodiment 7: an embodiment of any of embodiments 1-6, wherein the composition further comprises a solvent and/or a rheology modifier.

Embodiment 8: an embodiment of any of embodiments 1-7, wherein the adhesive composition comprises from 40 wt % to 90 wt % epoxy resin, based on the total weight of the adhesive composition.

Embodiment 9: an embodiment of any of embodiments 1-8, wherein the adhesive composition comprises from 1 wt % to 35 wt % bis(hexamethylene)triamine, based on the total weight of the adhesive composition.

Embodiment 10: an embodiment of any of embodiments 1-9, wherein the adhesive composition comprises from 1 wt % to 50 wt % solvent, preferably a phenol, based on the total weight of the adhesive composition.

Embodiment 11: an embodiment of any of embodiments 1-10, wherein the phenol comprises a nonyl phenol.

Embodiment 12: an embodiment of any of embodiments 1-11, wherein the adhesive composition comprises from 0.1 wt % to 20 wt % rheology modifier, preferably silica, based on the total weight of the adhesive composition.

Embodiment 13: an embodiment of any of embodiments 1-12, wherein the second part is not a solid.

Embodiment 14: an embodiment of any of embodiments 1-13, wherein the adhesive composition has a hydrogen active equivalent weight less than 65.

Embodiment 15: an embodiment of any of embodiments 1-14, wherein the adhesive composition demonstrates cross hatch adhesion score of at least 2B, as measured via ASTM D3359 method B.

Embodiment 16: an embodiment of any of embodiments 1-15, wherein the adhesive composition demonstrates a gel time greater than 10 minutes.

Embodiment 17: an embodiment of any of embodiments 1-16, wherein the adhesive composition, when cured, demonstrates yellowing index greater than 1.

Embodiment 18: a process for making an adhesive composition, comprising dissolving in a solvent a multifunctional amine package comprising bis(hexamethylene)triamine and a synergist to form a second part; contacting the second part with a first part comprising an epoxy resin to form the adhesive composition.

Embodiment 19: an embodiment of embodiment 18, further comprising adding a rheology modifier to the second part, such that the second part has a viscosity less than 1500 cps.

Embodiment 20: an embodiment of embodiments 18 or 19, wherein the adhesive composition has a Brookfield viscosity less than 1500 cps.

While the invention has been described in detail, modifications within the spirit and scope of the invention will be readily apparent to those of skill in the art in view of the foregoing discussion, relevant knowledge in the art, and references discussed above in connection with the Background and Detailed Description, the disclosures of which are all incorporated herein by reference. In addition, it should be understood that aspects of the invention and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit the invention.

We claim:

1. An adhesive composition comprising:
   a first part comprising an epoxy resin; and
   a second part comprising a multifunctional amine package comprising:
   bis(hexamethylene)triamine; and
   a synergist;
   wherein, in the adhesive composition, the amine concentration is at least 10% less than the epoxy resin concentration, and
   wherein the adhesive composition demonstrates a sag resistance ranging from 10 mm to 300 mm; and
   wherein, when cured, the cured composition demonstrates a Koenig hardness from 2 to 70, with a Koenig Hardness (1 day) from 2 to 20.

2. The composition of claim 1, wherein the synergist comprises acetonitrile, caprolactam, aminohexanol, aminocephalosporanic acid, aminocapronitrile, or adiponitrile, or combinations thereof.

3. The composition of claim 1, wherein the adhesive composition comprises less than 35 wt % cyclic amines, based on the total amine content.

4. The composition of claim 1, wherein the adhesive composition comprises a solvent, and wherein the solvent to bis(hexamethylene) triamine weight ratio ranges from 0.1 to 4.0.

5. The composition of claim 1, wherein the first part and the second part each has a volume, and wherein the volume ratio of the first part to the second part ranges from 0.2 to 5.

6. The composition of claim 1, wherein the adhesive composition, when mixed, has a Brookfield viscosity from 100 to 2000 cps.

7. The composition of claim 1, wherein the adhesive composition further comprises a solvent, a rheology modifier, or combinations thereof.

8. The composition of claim 1, wherein the adhesive composition comprises from 40 wt % to 90 wt % epoxy resin, based on the total weight of the adhesive composition.

9. The composition of claim 1, wherein the adhesive composition comprises from 1 wt % to 35 wt % bis(hexamethylene) triamine, based on the total weight of the adhesive composition.

10. The composition of claim 1, wherein the adhesive composition comprises from 1 wt % to 50 wt % of a phenol solvent based on the total weight of the adhesive composition.

11. The composition of claim 10, wherein the phenol comprises a nonyl phenol.

12. The composition of claim 1, wherein the adhesive composition comprises from 0.1 wt % to 20 wt % of a silica rheology modifier based on the total weight of the adhesive composition.

13. The composition of claim 1, wherein the second part is not a solid.

14. The composition of claim 1, wherein the adhesive composition has a hydrogen active equivalent weight less than 65.

15. The composition of claim 1, wherein the adhesive composition demonstrates a cross hatch adhesion score of at least 2B, as measured via ASTM D3359 method B.

16. The composition of claim 1, wherein the adhesive composition demonstrates a gel time greater than 10 minutes.

17. The composition of claim 1, wherein the adhesive composition, when cured, demonstrates yellowing index greater than 1.

18. A process for making an adhesive composition, comprising:
dissolving in a solvent a multifunctional amine package comprising bis(hexamethylene) triamine and a synergist to form a second part;
contacting the second part with a first part comprising an epoxy resin to form the adhesive composition; and
wherein, when cured, the cured composition demonstrates a Koenig hardness from 2 to 70, with a Koenig Hardness (1 day) from 2 to 20.

19. The process of claim 18, further comprising adding a rheology modifier to the second part, such that the second part has a viscosity less than 1500 cps.

20. The process of claim 18, wherein the adhesive composition has a viscosity from 100 to 2000 cps.

21. The process of claim 18, wherein the synergist comprises acetonitrile, caprolactam, aminohexanol, aminocephalosporanic acid, aminocapronitrile, or adiponitrile, or combinations thereof.

* * * * *